United States Patent [19]

Pistilli

[11] Patent Number: 4,897,120

[45] Date of Patent: Jan. 30, 1990

[54] ACCELERATOR FOR PORTLAND CEMENT DERIVED FROM FERTILIZER

[75] Inventor: Michael F. Pistilli, Lombard, Ill.

[73] Assignee: Gifford-Hill & Company, Inc., Dallas, Tex.

[21] Appl. No.: 145,556

[22] Filed: Jan. 19, 1988

[51] Int. Cl.$^4$ ............................................. C04B 24/00
[52] U.S. Cl. ................................................... 106/315
[58] Field of Search ......................................... 106/315

[56] References Cited

U.S. PATENT DOCUMENTS

| | | | |
|---|---|---|---|
| 523,658 | 7/1894 | Dawson . | |
| 2,437,842 | 3/1948 | Uhler | 106/90 |
| 3,100,526 | 8/1963 | Martin | 166/31 |
| 3,427,175 | 2/1969 | Angstadt et al. | 106/89 |
| 3,553,077 | 1/1971 | Quint | 162/154 |
| 3,782,984 | 1/1974 | Lyon et al. | 106/90 |
| 3,782,992 | 1/1974 | Uchikawa et al. | 106/315 |
| 4,064,191 | 12/1977 | Parekh | 260/850 |
| 4,088,818 | 5/1978 | Radici et al. | 544/186 |
| 4,089,695 | 5/1978 | Ray | 106/89 |
| 4,116,706 | 9/1978 | Previte | 106/90 |
| 4,337,094 | 6/1982 | Tokar | 106/90 |
| 4,473,405 | 9/1984 | Gerber | 106/90 |
| 4,606,770 | 8/1986 | Gerber | 106/90 |

FOREIGN PATENT DOCUMENTS

3543874A1  6/1987  Fed. Rep. of Germany .

OTHER PUBLICATIONS

Kantro, D. L., "Tricalcium Silicate Hydration in the Presence of Various Salts", Journal of Testing and Evaluation, JTEVA, vol. 3, No. 4, Jul. 1975, pp. 312–321.

American Cyanamic Company Bulletin "Cymel® 1172 Cross-Linking Agent", (6 pages).

*Primary Examiner*—Brian E. Hearn
*Assistant Examiner*—Andrew Griffs
*Attorney, Agent, or Firm*—Luke J. Wilburn, Jr.

[57] ABSTRACT

Method of producing a calcium nitrate composition, and the resulting composition, for use as a accelerator for time of set for portland cement in concrete and mortars comprising the steps of reacting a calcium ammonium nitrate hydrate composition with a tri- or tetramethylolglycoluril (TMGU) to crosslink with and convert the ammonia present therein into non-reactive, water-soluble components which exist in an aqueous medium at selected conditions of time, temperature, and pH.

7 Claims, No Drawings

ACCELERATOR FOR PORTLAND CEMENT DERIVED FROM FERTILIZER

This invention relates t a method of chemically changing a composition of calcium nitrate containing ammonium nitrate, which has heretofore been used as a fertilizer or additive therefor, to make it usable as an additive for portland cement concrete and mortars, and the resultant additive product produced by such method. This additive produces acceleration of time of set of such concrete and mortars, better compression strength development, and does not lead to the instigation of galvanic corrosion of steel rebar reinforcement embedded in the concrete.

BACKGROUND OF THE INVENTION

The term "portland cement" refers to a hydraulic cement (one which sets hard under water) obtained by burning a mixture of lime and clay to form a clinker which is pulverized to a greenish gray powder. Portland cement is composed primarily of hydraulic calcium silicates, with lesser amounts of calcium aluminates, calcium aluminoferrite, and one or more of the forms of calcium sulfate as an interground addition. When mixed with water, portland cement solidifies to an artificial rock, similar to portland stone.

The term "concrete" refers to a composite material primarily composed of a binding medium within which are embedded particles or fragments of aggregate having a wide range in mineralogical composition and fineness distribution. In portland cement concrete, the binder is a mixture of portland cement and water. The aggregates usually consist of a fine fraction, such as a natural sand, and a coarse fraction, such as a river gravel or a crushed stone. Mortar contains only the fine sand aggregate with water and cement paste.

In cold weather, e.g., 35°-50° F. (1.5°-10.0° C.), portland cement can have an extremely long period, e.g., 8 to 14 hours or longer, prior to the start of initial hardening, whereas under normal temperatures, 70°-75° F. (20°-24° C.), initial hardening occurs at about 2½ to 4 hours.

Calcium chloride ($CaCl_2$) is a commonly and widely used accelerator for portland cement concrete in cold weather to provide for acceleration of set. However, chloride-containing compounds have been shown to lead to the instigation of galvanic corrosion of steel rebar in reinforced concrete. Also in the presence of dissimilar metals in concrete, such as steel reinforcement, aluminum conduit, and galvanized metal decks, the potential for corrosion is magnified further when chloride-containing compounds are in excess of about 0.15% chloride ion by weight of portland cement. Thus, the need for an accelerator which is non-corrosive and non-chloride-containing is evident.

Calcium nitrate $Ca(NO_3)_2$ by itself, as well as in mixture with amounts of other compounds, has been used in the concrete industry to accelerate the setting time of portland cement concrete in cold weather. These calcium nitrate products are used in liquid form. Generally, the calcium nitrate used as an additive and accelerator with portland cement is a relatively high grade material having only minor amounts of impurities.

One publication which discloses the acceleration of concrete setting with calcium nitrate is Kantro, D. L., "Tricalcium Silicate Hydration in the Presence of Various Salts," Journal of Testing and Evaluation, JTEVA, Vol. 3, No. 4, July, 1975, pp. 312-321. Often, the calcium nitrate is mixed with other ingredients, such as alkanolamines or urea.

U.S. Pat. No. 4,337,094 discloses an additive composition comprising a concentrated aqueous solution of calcium nitrate, $Ca(NO_3)_2$, in combination with polyalkanolamines, preferably such as obtained in a triethanolamine (TEA) bottoms waste stream, when added to a portland cement-containing composition, provides good set acceleration and compressive strength enhancement. The patent states that the additive composition can provide acceleration in a chloride-free environment.

U.S. Pat. No. 4,606,770 discloses a hydraulic cement mix including hydraulic cement aggregate, sufficient water to affect hydraulic setting of the cement, and an additive comprising an N-methylol amide, specifically, tri- or tetramethylolglycoluril (herein referred to as TMGU) alone or in combination with other accelerators of set, such as calcium nitrate, to decrease the time necessary for hardening of the mix. However, the hydraulic cement mix produced by the process of U.S. Pat. No. 4,606,770 is understood to evolve copious amounts of ammonia in the fresh plastic state of the concrete, due to the presence of TMGU which, when mixed with concrete, breaks down and forms urea, which further breaks down to release ammonia in the fresh concrete.

U.S. Pat. No. 4,064,191 discloses an organic solvent solution of a mixture or blend of certain partially or fully alkylated glycoluril derivatives and certain organic solvent-soluble, normally non-self-crosslinking polymeric materials that are acid catalyzed which can be used as a coating resin on metal substrates.

Heretofore, a relatively inexpensive calcium ammonium nitrate hydrate composition of the general formulation $Ca(NO_3)_2$ $NH_4NO_3$ 10 $H_2O$ has been commercially available and used as fertilizer. One such product identified as industrial grade calcium nitrate is supplied by Norsk Hydro, a.s. of Norway and sold in the United States by William and George Meyers Co. of Toledo, Ohio. However, such a product was not used effectively as an accelerator for portland cement because when mixed with portland cement and water, the initial pH of the mixture is so high (greater than 12) as to cause evolution of ammonia gas from the composition during the mixing and placing of concrete, resulting in a health hazard or at least causing irritating conditions. West German Offenlegungsschrift No. DE-3543874-AI, inventor Hans-Rudiger Braun, which was published June 19, 1987, discloses the use of formaldehyde as a crosslinking agent to convert the ammonia which is present in the calcium ammonium nitrate hydrate type fertilizer composition to form a mixture of calcium nitrate, sodium nitrate, hexylmethylenetriamine, sodium hydroxide, and water. The composition is stated to be useful as an accelerator in portland cement.

BRIEF OBJECTS OF THE PRESENT INVENTION

It is therefore an object of the present invention to provide a method of chemically modifying a calcium ammonium nitrate hydrate composition of the type heretofore employed as a fertilizer to adapt it for use as an accelerator of time of set of portland cement.

It is a further object to provide an improved method for converting a relatively inexpensive source of calcium nitrate in the form of calcium ammonium nitrate hydrate into a form usable as an accelerator for portland cement concretes and mortars.

It is another object to provide an improved calcium nitrate composition which acts as a set accelerator for portland cement.

It is still a further object of the present invention to provide a calcium nitrate composition having improved acceleration of time of set, compression strength development, and absence of galvanic corrosion of steel reinforcement in concrete.

SUMMARY OF THE INVENTION

The present invention is directed to a method of chemically transforming a calcium ammonium nitrate composition heretofore employed as a fertilizer or additive therefor into an effective accelerator of set for portland cement. The method involves the reaction of a tri- or tetramethylolglycoluril (TMGU) with the calcium ammonium nitrate composition to crosslink with and convert ammonia present therein into non-reactive, water-soluble components which exist with sodium nitrate in aqueous media at selected conditions of time, temperature, and pH. The TMGU acts as a crosslinking agent producing a heterocyclic fused ring structure, hexamine, and other water-soluble by-products consisting of glycoluril derivatives and water. The resultant product may be effectively used as an accelerator for portland cement without undesirable evolution of ammonia during the mixing and placing of concrete.

The process of the present invention also is believed to produce a calcium nitrate composition useful as an accelerator for portland cement which gives improved set times over those additives utilizing relatively pure calcium nitrate, as well as the calcium ammonium nitrate compositions chemically modified by formaldehyde, as disclosed in the afore-mentioned West German patent. Also, storage and handling of TMGU is more simplified than the storage and handling of formaldehyde.

DETAILED DESCRIPTION OF PREFERRED EMBODIMENTS

The method of the present invention involves the chemical reaction and conversion of ammonia in a calcium ammonium nitrate composition into hexamine (IUPAC name, hexamethylenetetramine; also called urotropin) by reacting it with an amount of tetra- or tri methylolglycoluril (TMGU) that balances the empirical formula reaction:

$$4NH_3 + 1\tfrac{1}{2}\,[TMGU] \longrightarrow C_6H_{12}N_4 + 6H_2O + \text{Glycoluril}$$

(Ammonia)            (Hexamine)

The TMGU acts as a crosslinking agent producing the heterocylic fused ring structure hexamine, and other water-soluble by-products consisting of glycoluril derivatives, and water.

The overall theoretical reaction involves conversion of all of the ammonia present in the calcium ammonium nitrate hydrate composition into hexamine and other water-soluble glycoluril derivatives by using sodium hydroxide to liberate the ammonia at pH of between about 7.5 to 11.0 and using sodium hydroxide to neutralize the remaining nitrate, as follows:

$$4\,[5\,Ca(NO_3)_2 \cdot NH_4NO_3 \cdot 10\,H_2O] + 1\tfrac{1}{2}\,[TMGU] +$$

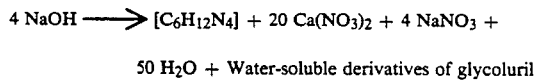

-continued $$4\,NaOH \longrightarrow [C_6H_{12}N_4] + 20\,Ca(NO_3)_2 + 4\,NaNO_3 +$$

$$50\,H_2O + \text{Water-soluble derivatives of glycoluril}$$

Although it would be thought that the above reaction would produce glycoluril which is water insoluble, it has been found that with sufficient heat, mixing, and reaction time, the insoluble glycoluril material is broken down into water-soluble components, such that the resultant reaction produces a water-soluble composition of materials which makes the composition practicable for use as an accelerator for portland cement. If acceleration of the reaction is desired, a suitable chelating agent, such as ethylenediaminetetraacetic acid (EDTA), may be added to speed solubilizing of the glycoluril components.

The conversion reaction of the present invention is carried out under alkaline conditions of pH, from about 7.5 pH up, preferably at a pH range between about 9 to 11. A suitable base, such as sodium hydroxide, may be employed to maintain the pH at the desired levels and to neutralize the remaining nitrate. Preferably, the reaction is carried out with stirring within a temperature range of between about 85° F. to 125° F. for not less than about 1 hour, to provide water solubility of the components of the composition.

The following examples are given by way of illustration of the present invention.

PREPARATION OF BATCH COMPOSITION 3353 lbs. H₂O @ 100° F. to 120° F. (38° C. to 50° C.) (405 gallons or 1533 liters) are placed in a reaction vessel. 4750 lbs. of calcium ammonium nitrate hydrate salt [5 Ca(NO₃)₂ . NH₄NO₃ . 10 H₂O] are slowly added to the water until all is dissolved. Prior to batching, the ammonia content in the calcium ammonium nitrate hydrate is determined by wet chemical quantitative analysis and an amount of TMGU, as determined by the theoretical reaction equation set forth above, (about 0.375 mole of calcium ammonium nitrate hydrate) is established. Based on this determination, 475 lbs. of an aqueous composition containing 45% by weight TMGU is added to the reaction vessel while stirring using adequate safety equipment and ventilation, followed by addition of 398.1 lbs. of 50% aqueous solution of sodium hydroxide, with vigorous stirring of the mixture for at least one hour while maintaining the temperature of the reaction of between about 85° F. (30° C.) and 125° F. (50° C.). The reaction mixture is cooled to room temperature and pumped into a final storage tank.

The final reaction product has the following properties and composition:

| | |
|---|---|
| Total Weight | 8976.1 lbs. (4071 Kg) |
| Density | 1.430 ± 0.020 g/ml @ 23° C. |
| Color | Clear to light yellow |
| pH | 9 to 11 |
| Yield in Volume | 750 gallons |
| 42.2% Ca(NO₃)₂ | |
| 3.3% NaNO₃ | |
| 51.0% H₂O | |
| 1.4% Hexamine (Urotropin) | |
| 1.1% NaOH | |
| 0.3% Mixture of glycoluril derivatives | |

This final composition is adjusted with water to attain a final concentration of approximately 43% solid by weight.

The presence of hexamine (urotropin) was found to have a favorable effect, not only on converting a calcium ammonium nitrate hydrate composition for use as a portland cement accelerator, but also favorably effected the performance in that a quicker time of set was produced, with higher compressive strength performance.

The following Tables give comparisons of tested properties of selected concrete mixtures containing portland cement without accelerator, and with the identified accelerators, which were mixed according to American Standard Test Method ASTM C192. The portland cement content of the mixtures was 517 lbs. per cubic yard. The water content varied in order to attain similar slump within ±½ inch. The volume air content in the concrete mixtures was controlled within ±1%. All of the calcium nitrate test compositions had a solids content of approximately 43% by weight. The calcium chloride composition was 32% solids by weight. The coarse aggregate consisted of crushed dolomite and the fine aggregate was a natural sand. These aggregates conformed to ASTM C33. The portland cements used conformed to ASTM C150. The concrete mix proportion was designed according to American Concrete Institute ACI 211.

TABLE I

Concrete Properties with Type II Portland Cement

| Additive | Fluid Ounces Accelerator Per 100 Lbs. Of Cement | Water/Cement Ratio (Weight %) | Slump (in.) | Air Content, (%, by vol.) | Initial Set, by ASTM C403 At 50° F. (hrs.:min.) | Compressive Strength, PSI (ASTM C39) 3 Days | 7 Days | 28 Days |
|---|---|---|---|---|---|---|---|---|
| Control No Additive | None | 0.54 | 4¾ | 5.5 | 9:45 | 3130 | 4400 | 5710 |
| Pure Ca(NO₃)₂, 45% weight solution | 20 | 0.54 | 4½ | 5.4 | 8:13 | 2910 | 4100 | 5905 |
| Pure Ca(NO₃)₂, 45% weight solution with 2.5% TEA* | 20 | 0.53 | 4¾ | 5.4 | 7:59 | 3350 | 4800 | 6010 |
| Invention Having Composition as Set Forth in Batch Composition | 20 | 0.51 | 5 | 5.5 | 7:31 | 3695 | 5310 | 6570 |

*NOTE:
TEA equals pure 99% Triethanolamine

TABLE II

Concrete Properties with Type I Huron Portland Cement

| Additive | Fluid Ounces Accelerator Per 100 Lbs. Of Cement | Water/Cement Ratio (Weight %) | Slump (in.) | Air Content, (%, by vol.) | Initial Set, by ASTM C403 At 50° F. (hrs.:min.) | Compressive Strength, PSI (ASTM C39) 3 Days | 7 Days | 28 Days |
|---|---|---|---|---|---|---|---|---|
| Control No Additive | None | 0.54 | 5¼ | 5.2 | 8:48 | 1950 | 4020 | 5200 |
| CaCl₂, 32% weight solution | 20 | 0.56 | 5½ | 5.0 | 7:30 | 2070 | 4100 | 5905 |
|  | 55 | 0.53 | 5¼ | 4.8 | 6:10 | 2600 | 4710 | 5600 |
| Pure Ca(NO₃)₂, 45% weight solution | 20 | 0.54 | 5½ | 5.0 | 7:55 | 1740 | 4120 | 5510 |
| Pure Ca(NO₃)₂, 45% weight solution With 2.5% TEA | 20 | 0.54 | 5½ | 5.3 | 7:31 | 2120 | 4390 | 5480 |
| One mole calcium ammonium nitrate crosslinked with 1.5 moles of formaldehyde | 20 | 0.52 | 4½ | 5.2 | 7:10 | 2000 | 4630 | 5500 |
|  | 40 | 0.52 | 5½ | 6.0 | 6:05 | 1910 | 4720 | 5700 |
| Invention of Batch Composition | 20 | 0.54 | 5 | 4.8 | 7:02 | 2050 | 4270 | 5810 |
|  | 40 | 0.51 | 5¾ | 5.5 | 6:00 | 2200 | 4400 | 5920 |

TABLE III

Concrete Properties with Type I Lonestar Portland Cement

| Additive | Fluid Ounces Accelerator Per 100 Lbs. Of Cement | Water/Cement Ratio (Weight %) | Slump (in.) | Air Content (%, by vol.) | Initial Set, by ASTM C403 At 50° F. (hrs.:min.) | Compressive Strength, PSI (ASTM C39) 3 Days | 7 Days | 28 Days |
|---|---|---|---|---|---|---|---|---|
| Control No Additive | None | 0.540 | 6¼ | 6.3 | 7:50 | 2580 | 4000 | 4860 |
| Pure Ca(NO₃)₂, 45% weight solution | 20 | 0.525 | 6 | 6.0 | 6:50 | 2500 | 4010 | 5000 |
| CaCl₂, 32% weight solution | 20 | 0.530 | 6 | 6.1 | 7:10 | 2770 | 4300 | 5280 |

TABLE III-continued

| | Concrete Properties with Type I Lonestar Portland Cement | | | | | | | |
|---|---|---|---|---|---|---|---|---|
| | Fluid Ounces Accelerator | Water/ Cement | | Air | Initial Set, by ASTM C403 | Compressive Strength, PSI (ASTM C39) | | |
| Additive | Per 100 Lbs. Of Cement | Ratio (Weight %) | Slump (in.) | Content (%, by vol.) | At 50° F. (hrs.:min.) | 3 Days | 7 Days | 28 Days |
| Invention of Batch Composition | 20 | 0.515 | 6½ | 6.8 | 6:21 | 2700 | 4270 | 5150 |

From the foregoing data represented in Tables I–III, it can be seen by comparison of the composition of the present invention with concrete mixes having no accelerator additive, a calcium chloride accelerator, a pure calcium nitrate accelerator, a pure calcium nitrate with triethanolamine accelerator, and a calcium ammonium nitrate hydrate modified by crosslinking with formaldehyde (as in the German patent), the calcium nitrate composition of the present invention exhibits improved acceleration of set and equivalent, if not improved, compressive strength over those accelerators compared thereto in the foregoing tests.

That which is claimed is:

1. A method of producing an additive suitable for use as a set accelerator in portland cement concrete and mortar mixes comprising the steps of reacting a calcium ammonium nitrate composition with a tri- or tetramethylolglycoluril compound under conditions to convert ammonia present in the composition into a non-reactive water-soluble hexamine and also produce water-soluble glycoluril derivatives.

2. A method as defined in claim 1 wherein the calcium ammonium nitrate composition is reacted with about 0.375 mole of a tri- or tetramethylolglycoluril compound per mole of calcium ammonium nitrate present in the composition.

3. A method as defined in claim 2 wherein the reaction is carried out at a pH of above about 7.5, with agitation, at a temperature of between about 85° F. to 125° F. for not less than about 1 hour.

4. A method as defined in claim 3 wherein sodium hydroxide is added to the reaction.

5. A method as defined in claim 1 wherein the reaction is carried out at a pH of above about 7.5.

6. A method as defined in claim 5 wherein the reaction is carried out at a pH of between about 9 to 11.

7. A method as defined in claim 1 wherein the reaction is carried out at a temperature of between about 85? F. to 125? F. with agitation for not less than about 1 hour.

* * * * *

UNITED STATES PATENT AND TRADEMARK OFFICE
CERTIFICATE OF CORRECTION

PATENT NO. : 4,897,120
DATED      : January 30, 1990
INVENTOR(S) : Michael F. Pistilli It is certified that error appears in the above–identified patent and that said Letters Patent is hereby corrected as shown below:

Column 1, Line 5, "t" should be -- "to"--;

Column 6, Table II, three lines from the bottom of the Table, the numerical data which reads as follows "6:05 1910 4720 5700" should be shifted to the right on the line to properly line up with the last four columns of numerical data in Table II;

Column 8, Line 29, after "85" change "?" to -- ° --;

Column 8, Line 30, after "125" change "?" to -- ° --.

Signed and Sealed this

First Day of January, 1991

Attest:

HARRY F. MANBECK, JR.

*Attesting Officer*    *Commissioner of Patents and Trademarks*